United States Patent Office 3,582,384
Patented June 1, 1971

3,582,384
PIGMENT FORMULATIONS
Horst Belde, Ewald Daubach, and Enno Luebcke, Ludwigshafen, Germany, assignors to Badische Anilin- & Soda-Fabrik Aktiengesellschaft, Ludwigshafen (Rhine), Germany
No Drawing. Filed May 23, 1969, Ser. No. 827,149
Claims priority, application Germany, May 30, 1968, P 17 69 488.1
Int. Cl. C09c 3/00
U.S. Cl. 106—308                  2 Claims

ABSTRACT OF THE DISCLOSURE

New formulations comprising pigment dyes, polyethylene and oleyl monoethanolamide which are outstandingly suitable for mass coloring thermoplastics.

This invention relates to pigment formulations suitable for mass coloring thermoplastics.

Formulations for coloring thermoplastics which contain the pigment finely dispersed in polyethylene are already known. They may be prepared for example by suspending the pigment in a solution of the polymer in a solvent such as a liquid hydrocarbon, precipitating the mixture of pigment and polyethylene from this solution by adding a liquid which is miscible with the solvent but not with polyethylene, and drying it. Since it is practically impossible to remove the solvent residues from the formulations thus obtained there is the disadvantage (when these formulations are used for the production of spun-dyed filaments) that the surface of the fiber forms scales owing to the escape of solvent at the processing temperature.

According to another method, formulations of the said type are prepared by the action of shear forces on a mixture of a pigment and polyethylene at elevated temperature. Since the dispersing effect of polyethylene is unsatisfactory however the desired state of subdivision of the pigment can only be achieved in these methods by the use of considerable energy. In some cases the high mixing temperature also has a detrimental effect of the quality of the formulation.

We have now found pigment formulations which do not exhibit the said disadvantage. Pigment formulations according to the invention, which are outstandingly suitable for mass coloring thermoplastics, contain (with reference to the total weight of components $(A)+(B)+(C)$):

(A) from 10 to 50% of a pigment dye:
(B) from 35 to 89% of a polyethylene having a mean molecular weight of from 4000 to 50,000; and
(C) from 1 to 15% of an acid amide of oleic acid and monoethanolamine.

The new formulations may contain inorganic pigments such as titanium dioxide, cadmium oxide, iron oxide or carbon black, or organic pigments such as those of the azo, phthalocyanine, quinacridone, anthraquinone or perylene tetracarboxylic acid series.

The new formulations contain a polyethylene with a mean molecular weight of from 4000 to 50,000 and a softening point of from 85° to 120° C.

The acid amide of oleic acid and monoethanolamine is obtained by known methods, for example by reaction of the fatty acid or any of its functional derivatives such as the acid chloride, with monoethanolamine. For example a particularly effective acid amide is obtained by reaction of 1 mole of crude oleic acid with 1.1 to 1.3 moles of monoethanolamine at temperature of from 120° to 180° C. The new formulations are prepared for example by allowing shear forces to act on a mixture of pigment, polyethylene and the oleic acid amide of the said type in the specified ratio by weight until the proper state of subdivision has been achieved. The process may be carried out for example in a mill or preferably in a kneader, advantageously at temperature at which the material being kneaded can be shaped. It is particularly advantageous to use a temperature range of from 80° to 110° C. It is possible to use the dye in the form of the aqueous cake. In this case the mixture of cake, polyethylene and amide is dried prior to the use of shear forces of the mixture containing water is kneaded in a heatable kneader, with or without applying a vacuum, at temperature of from 80° to 95° C. until the water has evaporated.

The new formulations, which may be in the form of powder, flakes or granules, are eminently suitable for the mass coloration of thermoplastics, for example polyamides and polyesters, and particularly polyolefins such as polyethylene or polypropylene.

Particularly good results are achieved with the new formulations in the spin dyeing of polyolefins such as polypropylene. There are thus obtained, even in the case of very full dyeings with dye contents of up to 3%, spin-dyed filaments which are characterized by a fine state of subdivision of the pigment, high tenacity and improved ship and windability.

The invention is illustrated by the following examples. The parts and percentages specified in the examples are by weight.

EXAMPLE 1

60 parts of a polyethylene having a mean molecular weight of 5400 is plasticated together with 10 parts of oleyl monoethanolamide in a steam heated kneader at from 90 to 95° C. While continuing the kneading, 120 parts of a 25% aqueous press cake of copper phthalocyanine is added and the whole is kneaded at the said temperature until the water has evaporated. Kneading is continued for another hour at about 70° to 95° C. The formulation obtained in this way is fairly viscous. It is cooled and granulated. Polypropylene filaments spin-dyed with this formulation contain the pigment in a very fine state of subdivision.

EXAMPE 2

120 parts of a 25% aqueous cake of halogenated copper phthalocyanine is mixed with 10 parts of oleyl monoethanolamide and the mixture is dried at 100° C. The dry material is introduced into a melt of 60 parts of polyethylene (mean molecular weight 5400) and the mixture is kneaded for one hour at from 70° to 95° C. A pigment formulation is obtained which is granulated in the usual way. When this material is used in the spinning of polypropylene, bright green filaments exhibiting a very fine state of subdivision of the pigment are obtained.

EXAMPLE 3

60 parts of polyethylene having a mean molecular weight of 5400, 10 parts of the acid amide prepared as described in the next paragraph and 30 parts of carbon black are mixed at 70° C. in a heatable kneader for twenty minutes and then kneaded for another hour at about 90° C. The formulation thus obtained is cooled and granulated.

100 parts of commercial oleic acid having an acid number of 185 to 210 and an iodine number of 75 to 95 is heated with 25 parts of monoethanolamine at 150° C. until no more water escapes. An amide is obtained of which 5 parts is dissolved in ethanol and uses up from 0.1 to 1, preferably from 0.5 to 1, ml. of O.I.N. caustic potash solution when titrated.

EXAMPLE 4

30 parts of polyethylene having a mean molecular weight of about 5000, 30 parts of polyethylene having a mean molecular weight of about 40,000, 10 parts of the fatty amide used in Example 3 and 30 parts of titanium dioxide are mixed for twenty minutes in a heatable kneader and then kneaded for one hour at from 90° to 110° C. The formulation thus obtained is cooled and granulated.

EXAMPLE 5

60 parts of polyethylene having a mean molecular weight of 40,000, 10 parts of the fatty acid amide described in Example 3 and 120 parts of a 25% aqueous cake of the dye C.I. Pigment Red 48 (Color Index number 15,865) are mixed for about thirty minutes in a heatable kneader and kneaded at 90° to 95° C. until the water has evaporated. The whole is then kneaded for another hour at from 90° to 110° C. The material is rolled and then granulated.

EXAMPLE 6

30 parts of polyethylene having a mean molecular weight of 5500, 30 parts of polyethylene having a mean molecular weight of 50,000, 10 parts of the acid amide specified in Example 3 and 30 parts of the dye C.I. Vat Blue 4 (Color Index No. 69,800) are kneaded for two hours at about 100° C. The material obtained is granulated in the conventional manner.

We claim:
1. A pigment formulation containing:
  (A) from 10 to 50% of a pigment;
  (B) from 35 to 89% of a polyethylene having a mean molecular weight of from 4000 to 50,000; and
  (C) from 1 to 15% of an acid amide of oleic acid and monoethanolamine, the percentages being with reference to the total weight of components (A), (B) and (C).

2. A pigment formulation containing:
  (A) 30% of copper phthalocyanine;
  (B) 60% of a polyethylene having a mean molecular weight of 5400; and
  (C) 10% of oleyl monoethanolamide,
      the percentages being with reference to the total weight of components (A), (B) and (C).

References Cited

UNITED STATES PATENTS

| | | | |
|---|---|---|---|
| 2,938,879 | 5/1960 | Mock et al. | 260—41BX |
| 3,197,425 | 7/1965 | König et al. | 106—308NX |

FOREIGN PATENTS

| | | | |
|---|---|---|---|
| 1,042,906 | 9/1966 | Great Britain | 106—288Q |

JAMES E. POER, Primary Examiner

H. M. S. SNEED, Assistant Examiner

U.S. Cl. X.R.

106—288, 300, 304, 307, 308N; 260—41